United States Patent
Jussli et al.

(10) Patent No.: US 12,194,904 B2
(45) Date of Patent: Jan. 14, 2025

(54) AIRCRAFT SEAT DEVICE, AIRCRAFT SEAT, METHOD FOR PRODUCING THE AIRCRAFT SEAT DEVICE, AND MODULAR SYSTEM

(71) Applicant: RECARO Aircraft Seating GmbH & Co. KG, Schwäbisch Hall (DE)

(72) Inventors: Zoltan Jussli, Bretzfeld (DE); Tim Schreyer, Schwaebisch Hall (DE); Thomas Drenzeck, Michelfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 190 days.

(21) Appl. No.: 17/786,828

(22) PCT Filed: Dec. 18, 2020

(86) PCT No.: PCT/EP2020/087246
§ 371 (c)(1),
(2) Date: Jun. 17, 2022

(87) PCT Pub. No.: WO2021/123324
PCT Pub. Date: Jun. 24, 2021

(65) Prior Publication Data
US 2023/0025571 A1    Jan. 26, 2023

(30) Foreign Application Priority Data

Dec. 20, 2019 (DE) .................... 10 2019 135 393.9

(51) Int. Cl.
*B60N 2/68*    (2006.01)
*B64D 11/06*   (2006.01)
*B64F 5/10*    (2017.01)

(52) U.S. Cl.
CPC ............... *B60N 2/682* (2013.01); *B60N 2/68* (2013.01); *B60N 2/686* (2013.01); *B64D 11/06* (2013.01);
(Continued)

(58) Field of Classification Search
CPC .......... B60N 2/686; B60N 2/68; B60N 2/682; B64D 11/0638; B64D 11/00151; B64D 11/0642; B64D 11/0647
See application file for complete search history.

(56) References Cited

U.S. PATENT DOCUMENTS

| | | | |
|---|---|---|---|
| 6,644,738 B2 | 11/2003 | Williamson | |
| 9,039,081 B2* | 5/2015 | Arefi .................. | B60N 2/68 297/217.3 |
| 9,938,014 B2* | 4/2018 | Everhart .............. | H05K 5/0017 |

(Continued)

FOREIGN PATENT DOCUMENTS

| | | |
|---|---|---|
| DE | 202008006304 U1 | 11/2008 |
| DE | 102008061609 A1 | 6/2010 |

(Continued)

OTHER PUBLICATIONS

German Search Report dated Dec. 15, 2020, issued in corresponding German Patent Application No. 102019135393.9 (and English translation).

(Continued)

*Primary Examiner* — Timothy J Brindley
(74) *Attorney, Agent, or Firm* — Posz Law Group, PLC

(57) ABSTRACT

An aircraft seat device has a multi-part backrest frame unit comprising at least one first side frame element, at least one second side frame element, which is arranged on a side of the backrest frame unit that is opposite from the first side frame element, and at least one transverse frame element which is realized separately from the side frame elements (Continued)

and connects the side frame elements, wherein the transverse frame element is realized at least substantially plate-shaped.

15 Claims, 11 Drawing Sheets

(52) U.S. Cl.
CPC ............ *B64D 11/0647* (2014.12); *B64F 5/10* (2017.01); *B64D 11/0649* (2014.12)

(56) References Cited

U.S. PATENT DOCUMENTS

| | | | |
|---|---|---|---|
| 2011/0156452 A1 | 6/2011 | Schumm et al. | |
| 2012/0326483 A1 | 12/2012 | Baumgarten | |
| 2013/0119743 A1* | 5/2013 | Evans | B29C 45/14786 297/452.18 |
| 2014/0159436 A1 | 6/2014 | Iacobucci | |
| 2014/0300171 A1* | 10/2014 | Velasco | A47C 5/06 297/452.18 |
| 2015/0145313 A1 | 5/2015 | Lee et al. | |
| 2015/0314501 A1* | 11/2015 | Maslakow | B60N 2/686 297/452.18 |
| 2017/0080832 A1 | 3/2017 | Fujita et al. | |
| 2018/0201169 A1 | 7/2018 | Hashimoto et al. | |
| 2018/0339777 A1* | 11/2018 | Yaghoubi | B64D 11/0646 |
| 2019/0071183 A1* | 3/2019 | Lasell | B29C 70/086 |
| 2019/0143913 A1* | 5/2019 | Jones | B60N 2/914 297/217.3 |
| 2020/0079261 A1* | 3/2020 | Iossifidis | B64D 11/0642 |
| 2020/0307804 A1* | 10/2020 | Challenor | B60N 3/004 |
| 2021/0387732 A1* | 12/2021 | Salzer | B64D 11/0601 |
| 2022/0176851 A1* | 6/2022 | Silipo | B60N 2/853 |
| 2023/0331128 A1* | 10/2023 | Mansouri | B60N 2/70 |

FOREIGN PATENT DOCUMENTS

| | | | | |
|---|---|---|---|---|
| DE | 102010007052 A1 | | 8/2011 | |
| DE | 202012101882 U1 | | 7/2012 | |
| DE | 102013100532 A1 | | 7/2013 | |
| DE | 102013100533 A1 | * | 7/2013 | ............... B60N 2/90 |
| DE | 102018208153 A1 | * | 11/2018 | ............... B60N 2/68 |
| DE | 102019108493 A1 | * | 10/2020 | ........... B60N 2/4221 |
| DE | 102020106039 A1 | * | 9/2021 | ......... B64D 11/0606 |
| DE | 102021116542 A1 | * | 12/2022 | |
| EP | 2572931 A1 | | 3/2013 | |
| EP | 2583862 A1 | | 4/2013 | |
| EP | 3733517 A1 | * | 11/2020 | ......... B64D 11/0619 |
| GB | 2405790 A | | 3/2005 | |
| WO | WO-8502384 A1 | * | 6/1985 | |
| WO | 2008/066975 A1 | | 6/2008 | |
| WO | 2014/058399 A1 | | 4/2014 | |
| WO | WO-2015016781 A1 | * | 2/2015 | ............... B60N 2/01 |
| WO | WO-2016021554 A1 | * | 2/2016 | ............... A47C 7/40 |
| WO | WO-2016076352 A1 | * | 5/2016 | ........... B60N 2/0232 |
| WO | WO-2016128524 A1 | * | 8/2016 | ............... B60N 2/22 |
| WO | 2018/129033 A1 | | 7/2018 | |
| WO | WO-2020249592 A1 | * | 12/2020 | ............ B60N 2/879 |

OTHER PUBLICATIONS

English translation of International Preliminary Report on Patentability dated May 17, 2022 issued in corresponding International Patent Application No. PCT/EP2020/087246.

English translation of International Search Report of the International Searching Authority mailed Jun. 2, 2021 for the corresponding International Application No. PCT/EP2020/087246.

* cited by examiner

AIRCRAFT SEAT DEVICE, AIRCRAFT SEAT, METHOD FOR PRODUCING THE AIRCRAFT SEAT DEVICE, AND MODULAR SYSTEM

CROSS REFERENCE TO RELATED APPLICATIONS

This application is a U.S. national stage application of PCT/EP2020/087246 filed on Dec. 18, 2020 which is based on German Patent Application No. 10 2019 135 393.9 filed on Dec. 20, 2019, the contents of which are incorporated herein by reference.

TECHNICAL FIELD

The invention relates to an aircraft seat device, an aircraft seat, a method for producing the aircraft seat device and a modular system.

BACKGROUND

An aircraft seat device has already been proposed which has a multi-part backrest frame unit comprising at least one first side frame element, at least one second side frame element, which is arranged on a side of the backrest frame unit opposite from the first side frame element, and at least one transverse frame element, which is realized separately from the side frame elements and connects the side frame elements.

SUMMARY

The object of the invention is in particular to provide a generic device having improved properties with regard to flexibility, in particular versatility.

The invention is based on an aircraft seat device having a multi-part backrest frame unit comprising at least one first side frame element, at least one second side frame element, which is preferably separate from the first side frame element and which is arranged on a side of the backrest frame unit opposite from the first side frame element, and at least one transverse frame element which is realized separately from the side frame elements and connects the side frame elements and which, in particular, is arranged at an upper end of the backrest frame unit.

It is proposed that the transverse frame element is realized at least substantially plate-shaped. As a result, high flexibility and/or versatility can advantageously be achieved, in particular in that a great deal of creative freedom for mounting and/or integrating functional units in the backrest frame unit is made possible. Advantageously, high functional integration into the backrest frame unit can be made possible. In addition, high stability of the backrest frame unit can advantageously be achieved as a result. Additionally, simple assembly of the backrest frame unit can advantageously be achieved.

An "aircraft seat device" is intended in particular to be understood as at least a part, in particular a lower assembly, of an aircraft seat, in particular an aircraft passenger seat. For example, an aircraft seat having the aircraft seat device could be a window seat, a middle seat or an aisle seat which, in particular, can be arranged in a front-most row or in a middle row within an aircraft. The "backrest frame unit" is in particular formed as a component imparting stability to the aircraft seat, in particular a backrest of the aircraft seat. In particular, the backrest frame unit forms a load-bearing structure of the backrest of the aircraft seat. Preferably, the backrest frame unit forms a base structure and/or a basic shape of the backrest of the aircraft seat. In particular, the frame unit defines and/or surrounds a leaning surface of a leaning area of the aircraft seat. In particular, the backrest frame unit comprises at least one first side frame element, at least one second side frame element and at least one transverse frame element. In particular, it is conceivable that the backrest frame unit has further side frame elements or further transverse frame elements and/or that at least one of the elements of the multi-part backrest frame unit is likewise again formed from many parts. In particular, the backrest frame unit is configured to receive a cover or a surface element adhesively bonded to the backrest frame unit. In particular, the side frame elements bound the backrest frame unit on opposite, preferably not mutually adjacent, sides of the aircraft seat device. In particular, the side frame elements span a leaning area. In particular, the leaning area extends at least between the side frame elements. In particular, the side frame elements extend at least substantially parallel to each other. However, it can also be imagined that the side frame elements deviate substantially from a mutually parallel course. "Configured" is in particular to be understood as specifically programmed, designed and/or equipped. The fact that an object is configured for a specific function is in particular to be understood that the object fulfils and/or carries out this specific function in at least one application and/or operating state.

Here, "substantially parallel" is to be understood in particular as an alignment of a direction relative to a reference direction, in particular in a plane, wherein the direction has a deviation relative to the reference direction in particular of less than 8°, advantageously less than 5° and particularly advantageously less than 2°. In particular, the side frame elements are formed as profiles, for example as extruded profiles. In particular, the side frame elements are separate from one another and/or separable. Alternatively, however, it can also be imagined that the side frame elements are connected to each other in one piece via a connection by means of at least one further transverse frame element which, for example, is arranged at half the height of the side frame elements. In particular, the side frame elements and/or the transverse frame element are at least partly or completely formed from a plastic and/or a metal, for example a particularly lightweight aluminum or magnesium alloy. A "substantially plate-shaped" object is to be understood in particular as an at least substantially flat object, wherein in particular in this connection, a "substantially flat" object is to be understood as an object of which the surface extent parallel to the largest side surface of the smallest imaginary cube which just completely encloses the object is at least 5 times, preferably at least 7 times, preferably at least 10 times and particularly preferably at least 14 times larger than a surface extent of all the side surfaces of the smallest imaginary cube that are perpendicular to the largest side surface of the smallest imaginary cube. The plate-shaped object has in particular an at least substantially flat surface which, if appropriate, can be provided with recesses, passages and/or depressions, in particular for embedding functional units.

In particular, a height of the transverse frame element at a narrowest, in particular least high, location of the transverse frame element is at least 5 times, preferably at least 7 times, preferably at least 10 times and particularly preferably at least 14 times as large as an in particular maximum depth of the transverse frame element, wherein the height and the depth are in particular based on an envisaged mounting direction of the aircraft seat having the aircraft seat device.

In particular, a width of the transverse frame element at a narrowest, in particular at the least wide, location of the transverse frame element is at least 5 times, preferably at least 10 times, preferably at least 14 times and particularly preferably at least 20 times as large as an in particular maximum depth of the transverse frame element, wherein the width is based in particular on an envisaged mounting direction of the aircraft seat having the aircraft seat device. In particular, the transverse frame element has an at least substantially rectangular, preferably cubic and preferably right-angled shape, wherein in particular edge regions can be rounded. In particular, an in particular maximum height of the transverse frame element, preferably measured vertically in an operation-ready state, is at least 10 cm, advantageously at least 15 cm, particularly advantageously at least 20 cm, preferably at least 25 cm, preferably at least 30 cm and particularly preferably at most 80 cm. In particular, an in particular maximum width of the transverse frame element, preferably measured horizontally in the operation-ready state, is at least 10 cm, advantageously at least 20 cm, preferably at least cm, preferably at least 38 cm and particularly preferably at most 80 cm. In particular, an in particular maximum depth of the transverse frame element, preferably measured horizontally in the operation-ready state, is at least 15 mm. In particular, the depth of the transverse frame element is at most 27 mm, advantageously at most 35 mm, preferably at most 40 cm, preferably at most 60 mm and particularly preferably at most 80 mm.

Furthermore, it is proposed that the transverse frame element is formed in one piece, preferably monolithically. As a result, particularly high stability can advantageously be achieved. In addition, simple mounting and/or simple integration of functional units into the transverse frame element can advantageously be made possible. In particular, the transverse frame element is formed in one piece, apart from small parts, e.g. attachment parts such as nuts, molded or inserted into the transverse frame element. "One-piece" is intended in particular to be understood as at least integrally connected, for example by means of a welding process, an adhesive bonding process, an overmolding process and/or another process appearing expedient to those skilled in the art, and/or advantageously formed in one piece, such as, for example, by means of production from a casting and/or by means of production in a single-component or multi-component injection molding method and advantageously from a single blank.

In addition, it is proposed that the transverse frame element has an edging running at least partly around the transverse frame element and projecting at least substantially perpendicularly from a plate plane of the transverse frame element. As a result, high stability, in particular with respect to torsional loadings, can advantageously be achieved. Advantageously, a high level of stiffness, in particular with respect to torsion, and/or a reinforcement of the backrest frame unit can be achieved. In particular, the edging forms an extension of the side frame elements. In particular, the edging extends from the first side frame element as far as the second side frame element. In particular, the edging replicates a circumferential frame. In particular, the edging runs at least substantially in a U shape around the transverse frame element. In particular, the transverse frame element has the edging at least on a part of a left-hand side of the transverse frame element as viewed from a front side in an mounting direction. In particular, the transverse frame element has the edging at least on a part of a right-hand side of the transverse frame element as viewed from the front side in an mounting direction. In particular, the transverse frame element has the edging at least on a part of an upper side of the transverse frame element as viewed in the mounting direction. In particular, the transverse frame element has the edging at least on a part of a lower side of the transverse frame element as viewed in the mounting direction. However, in particular the lower side can also be completely free of the edging. In particular the edging runs at least around an upper part of the left-hand side, around the upper side and around an upper part of the right-hand side of the transverse frame element. The expression "substantially perpendicular" is intended here in particular to define an alignment of a direction relative to a reference direction, wherein the direction and the reference direction, in particular viewed in a projection plane, enclose an angle of 90° and the angle has a maximum deviation of in particular less than 8°, advantageously less than 5° and particularly advantageously less than 2°. A "plate plane" is intended in particular to be understood as a main extension plane of the transverse frame element. A "main extension plane" of a structural unit is intended in particular to be understood as a plane which is parallel to a largest side surface of a smallest imaginary cube which just completely encloses the structural unit, and in particular extends through the center of the cube. Alternatively or additionally, the transverse frame element can have a stiffening element that is different from an edging. For example, a depression extending in an internal region of the transverse frame element with side walls at least substantially perpendicular to the plate plane. The stiffening element and/or the edging can in particular have a multiplicity of various courses, for example an at least sectionally angular, an at least sectionally curved or an at least sectionally bent course.

In addition, it is proposed that the transverse frame element has a skeleton-like structure. As a result, high stability with a simultaneously low overall weight can advantageously be achieved. In addition, a use of material can advantageously be kept low. In particular, the transverse frame element has a skeleton design. In particular, a skeleton-like structure has a multiplicity of cavities, passages and/or recesses. In particular, the skeleton-like structure comprises at least a plurality of recesses, which penetrate the transverse frame element in a direction extending at least substantially perpendicular to a main extension plane of the transverse frame element. In particular, at least two of the recesses of the skeleton-like structure, preferably all the recesses of the skeleton-like structure, are arranged mirror-symmetrically relative to at least one mirror plane extending in particular outside the recesses. In particular, a skeleton-like structure has a multiplicity of strut-like structural elements connected to one another.

In addition, it is proposed that the transverse frame element has at least one integrally formed connection element for fastening at least one of the side frame elements. As a result, particularly simple assembly can advantageously be made possible. In addition, particularly high stability can advantageously be achieved. Additionally, particularly cost-effective fabrication can advantageously be made possible. In particular, the transverse frame element has at least two integrally formed connection elements for fastening the two side frame elements. An "integral formation" is intended in particular to be understood as a one-piece and/or monolithic formation of the connection element with the transverse frame element.

If the connection element is formed as a cavity in the transverse frame element that is matched to an outer shape of the side frame element, particularly simple assembly and/or particularly high stability can advantageously be achieved. The cavity is bounded on at least two sides, preferably at least three sides and preferably at least four sides, by walls formed by the transverse frame element. In particular, the side frame elements are configured to be pushed into the respective cavities during assembly of the backrest frame unit and preferably to be fixed in the cavities, for example with screws, rivets or the like. Alternatively, the transverse frame element could have integrally formed or attached studs, which are each configured to be pushed into recesses of the side frame elements which, for example, can be formed as hollow profiles, to form a connection with the side frame elements.

Furthermore, it is proposed that the transverse frame element has at least one fastening unit, which is configured for the mounting of at least one functional unit. As a result, high flexibility and/or versatility can advantageously be achieved, in particular in that a great deal of creative freedom for mounting and/or integrating functional units in the backrest frame unit is made possible. Advantageously, high functional integration into the backrest frame unit can be made possible. In particular, the fastening unit forms a fastening matrix, for example a hole matrix and/or a receiving matrix, having one or more fastening elements, for example holes and/or receiving regions specifically adapted for fastening specific functional units. In particular, the fastening unit is connected in one piece and/or monolithically to the transverse frame element.

If the functional unit is realized as a headrest, as a headrest mount, as an aircraft meal table locking, as a tall literature pocket, as a monitor, as a monitor mount, as an upholstery and/or cover attachment, as a cup holder, as a tablet holder, as a coat hanger, as a stowage compartment, as an advertising frame or as a USB connector or as a further electronic component, high versatility, in particular high functional integration into the backrest frame unit, can advantageously be made possible. In addition, it is conceivable that the functional unit is designed as at least one energy absorption element, for example as an arrangement of intended fracture points, which is configured to damp an impact of a passenger, in particular a head of a passenger, on the transverse frame element. In particular, the headrest mount is designed as a rail for the fixing of a headrest that is displaceable along the rail. In particular, the monitor mount is designed as a fixing for the displaceable and/or pivotable mounting of the monitor. In particular, it is conceivable that the transverse frame element has one or more cable guide/s for electrical connecting cables and/or an integrated electronics unit, in particular a computing unit, which is electrically connected to at least one of the functional units.

If, in addition, the fastening unit has at least two fastening elements, wherein each of the fastening elements is configured for fastening different implementations of one of the functional units, particularly high flexibility and/or versatility can advantageously be achieved. In particular, as a result the ability to tailor the aircraft seat simply can be made possible in which, for example, different or the same functional units with different sizes and/or from different manufacturers can be combined with the same transverse frame element. In particular, a first fastening element is configured for the mounting of a first functional unit, while a second fastening element is configured for the mounting of a second functional unit, which has a size and/or shape differing from the first functional unit and/or a manufacturer differing from the manufacturer of the first functional unit. In particular, the first fastening element and the second fastening element are arranged on a same side, for example a front side or a rear side, of the transverse frame element. Alternatively, the first fastening element and the second fastening element can be arranged on different, in particular opposite, sides of the transverse frame element. In particular, the fastening unit can have more than two fastening elements, which can in particular be arranged in any desired number on any desired sides of the transverse frame element. In particular, a fastening element is designed specifically for fastening a specific functional unit. For example, it is conceivable that the fastening element is a recess or a projection which is configured for a force-fitting and/or form-fitting connection to a functional unit, for example by being plugged in, latched in and/or screwed in.

Furthermore, it is proposed that the fastening unit on a first side of the transverse frame element has at least one first fastening element, and that the fastening unit on a second side of the transverse frame element, opposite from the first side, has at least one second fastening element, wherein the first fastening element is configured for mounting an aircraft meal table locking or a monitor attachment, and wherein the second fastening element is configured for mounting a headrest and/or a headrest mount. As a result, a particularly versatile aircraft seat device can advantageously be achieved. Advantageously, a particularly practical and/or useful combination of functional elements with the transverse frame element can be achieved as a result. Advantageously, simple mounting of the aircraft meal table locking and the headrest can be achieved. In particular, the first side is arranged on a rear side of the backrest of the aircraft seat. In particular, the second side is arranged on a front side, in particular a seat side, preferably a side of the leaning area of the backrest of the aircraft seat. In particular, the aircraft seat device has a headrest and/or headrest mount fastened to the transverse frame element on a front side. In particular, the aircraft seat device has an aircraft meal table locking which, for example, comprises a pushbutton and/or a pivoting lever, on a rear side.

Furthermore, it is proposed that at least the first side frame element is configured for mounting a cover of the backrest frame unit and/or a surface element that can be bonded on. As a result, high flexibility and/or versatility can advantageously be achieved. Advantageously, simple assembly by using the fewest possible individual parts can be achieved. In particular, the second side frame element is also configured for mounting a cover of the backrest frame unit and/or a surface element that can be bonded on. In particular, the first side frame element and/or the second side frame element has a piping guide, which is configured to receive piping of a cover. Alternatively or additionally, the first side frame element and/or the second side frame element has a bonding surface, which is configured to be bonded to the surface element. In particular, the cover and/or the surface element extends between the side frame elements and forms the leaning area.

In addition, it is proposed that the transverse frame element, in particular viewed in the mounting direction of the aircraft seat, forms an upper termination of the backrest frame unit. As a result, high stability can advantageously be achieved. In particular, the side frame elements are each connected to the transverse frame element in end regions of the side frame elements. In particular, the aircraft seat is free of further components above the upper termination.

Furthermore, it is proposed that the transverse frame element in particular at least partly forms a visible part of an aircraft seat backrest. As a result, particularly high flexibility and/or versatility can advantageously be achieved. In addition, a particularly cost-effective embodiment can advantageously be achieved, in particular in that it is possible to dispense with an additional cladding component, which in particular is mounted on the transverse frame element, at least in the area of the transverse frame element, in particular in the area of the transverse frame element in which the transverse frame element is directly visible when assembled. In particular, a visible part is visible and/or touchable directly by an observer in a finally assembled state. In particular, the transverse frame element has surface structuring, for example graining, on visible and/or touchable surfaces. In particular, the transverse frame element, preferably the visible and/or touchable part of the transverse frame element, has a class A surface.

In addition, it is proposed that the backrest frame unit has at least one further transverse frame element, which is connected to the side frame elements in a central area of the side frame elements. As a result, stability and/or stiffness, in particular with respect to torsion, can advantageously be further increased. In particular, the further transverse frame element is arranged in a lower or in an upper half of the backrest frame unit. Preferably, the further transverse frame element is arranged approximately at the height of a lumbar region of an individual sitting on the aircraft seat. The further transverse frame element is formed from the same material as the transverse frame element. Alternatively, the further transverse frame element can be formed from a different material than the transverse frame element. In particular, the further transverse frame element is formed from a plastic and/or from a metal. Preferably, the further transverse frame element is formed in one piece. In particular, the further transverse frame element is plugged onto the side frame elements or screwed or riveted or the like to the side frame elements.

Alternatively, the further transverse frame element can also be connected integrally to the side frame elements, for example welded.

If the transverse frame element is, at least to a large extent, produced by means of primary forming, high flexibility with respect to the shaping of the transverse frame element can advantageously be achieved. Advantageously, simple and cost-effective production of the transverse frame element can be made possible. In this connection, "large extent" is to be understood as in particular at least up to 80%, preferably at least up to 90% and preferably at least up to 95%. In particular, the transverse frame element, apart from small milling, bending and/or punching operations in the final fabrication, for example in order to remove irregularities, to cut threads, to form small holes, et cetera, is produced completely by means of primary forming. In particular the basic body of the transverse frame element, which is in particular already different from a monolithic block or a monolithic plate, is produced by means of primary forming. In particular, the transverse frame element is produced, at least to a large extent, by means of a primary forming process according to the definition of DIN 8580:2003-09, or by means of a 3D printing process. In particular, the transverse frame element is, at least to a large extent, produced free of primary forming processes and/or joining processes, in particular according to the definition of DIN 8580:2003-09. In particular, the transverse frame element is produced free of bending processes. In particular, the transverse frame element is produced free of a lamination process. In particular, the transverse frame element is free of carbon fibers. Alternatively, however, it is also conceivable that the transverse frame element is produced by means of milling or by means of a sheet metal bending process.

Furthermore, it is proposed that the transverse frame element is produced as a cast part, in particular an injection molded part and/or a diecast part. As a result, high flexibility with respect to the shaping of the transverse frame element can advantageously be achieved. Advantageously, simple and cost-effective production of the transverse frame element can be made possible. In particular, the transverse frame element is produced in a plastic injection molding process, in an aluminum diecasting process or in a magnesium diecasting process. In addition, it is conceivable that the transverse frame element is formed as a multi-component injection molded part or as a hybrid diecast-injection molded part. As a result, in particular advantageous material properties can be combined. As a result, cost, weight and/or stability can advantageously be optimized.

In addition, an aircraft seat having the aircraft seat device and a method for producing the aircraft seat device are proposed. As a result, high flexibility and/or versatility can advantageously be achieved, in particular in that a great deal of creative freedom for mounting and/or integrating functional units in the backrest frame unit is advantageously possible.

Additionally, a modular system for assembling the aircraft seat device is proposed. The modular system comprises at least one set of differently realized pairs of side frame elements and least one set of differently realized transverse frame elements, which each have connection elements which permit assembly of all the pairs of side frame elements of the set of side frame elements. As a result, high flexibility and/or versatility can advantageously be achieved, in particular in that a multiplicity of various aircraft seat devices can be created for an extremely wide range of applications and/or occupancy classes in aircraft without great additional effort. Advantageously, a completely different backrest frame unit does not have to be produced for each application or occupancy class. In particular, the set of differently realized pairs of side frame elements comprises side frame elements which have different lengths, thicknesses, materials or shapes. In particular, the set of differently realized transverse frame elements comprises transverse frame elements which have different widths, different heights, different depths, different materials and/or different shapes. In particular, the set of differently realized transverse frame elements comprises transverse frame elements which have different fastening units and/or are configured for the mounting of different functional units. For example, the set of differently realized transverse frame elements comprises a transverse frame element with a fastening unit for a monitor, a transverse frame element with a fastening unit for a headrest, a transverse frame element with a fastening unit for an aircraft meal table locking, a transverse frame element with a tall literature pocket, and so on. In particular, one or more transverse frame elements can have a plurality of different connection elements for the attachment of different side frame elements or to form different aircraft seat widths. In particular, all the transverse frame elements of the set of transverse frame elements can be combined with all the side frame elements of the set of pairs of side frame elements.

If the different transverse frame elements of the set of differently realized transverse frame elements are configured for the assembly of aircraft seat devices of different widths, in particular aircraft seats of different widths, particularly high flexibility and/or versatility can advantageously be achieved. In particular, the set of differently realized transverse frame elements comprises transverse frame elements having different widths or transverse frame elements in which the connection elements are arranged at different spacings.

Here, the aircraft seat device according to the invention, the aircraft seat according to the invention, the method according to the invention and the modular system according to the invention are not intended to be restricted to the above-described application and embodiment. In particular, the aircraft seat device according to the invention, the aircraft seat according to the invention, the method according to the invention and the modular system according to the invention can have a number of individual elements, components, method steps and units differing from a number mentioned herein to fulfil a function described herein. In particular, the method steps can also, at least to some extent, have a different order, comprise additional intermediate method steps and/or at least partly proceed chronologically parallel with one another.

BRIEF DESCRIPTION OF THE DRAWINGS

Further advantages emerge from the following drawing description. In the drawing, two exemplary embodiments of the invention are illustrated. The drawing, the description and the claims contain numerous features in combination. Those skilled in the art will expediently also view the features individually and combine them to form further appropriate combinations.

In the figures.

DETAILED DESCRIPTION

Figure 1:
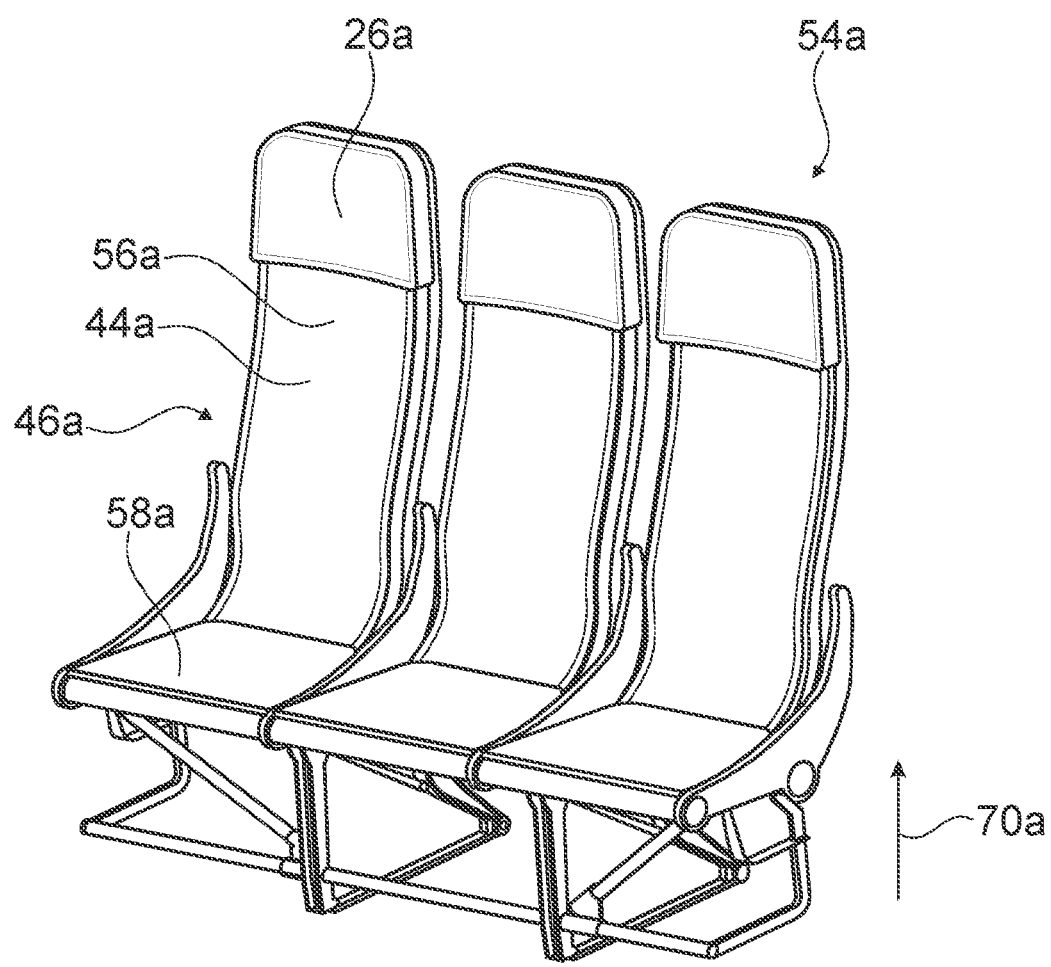
FIG. 1 shows a schematic illustration of an aircraft seat having an aircraft seat device.
Figure 2:
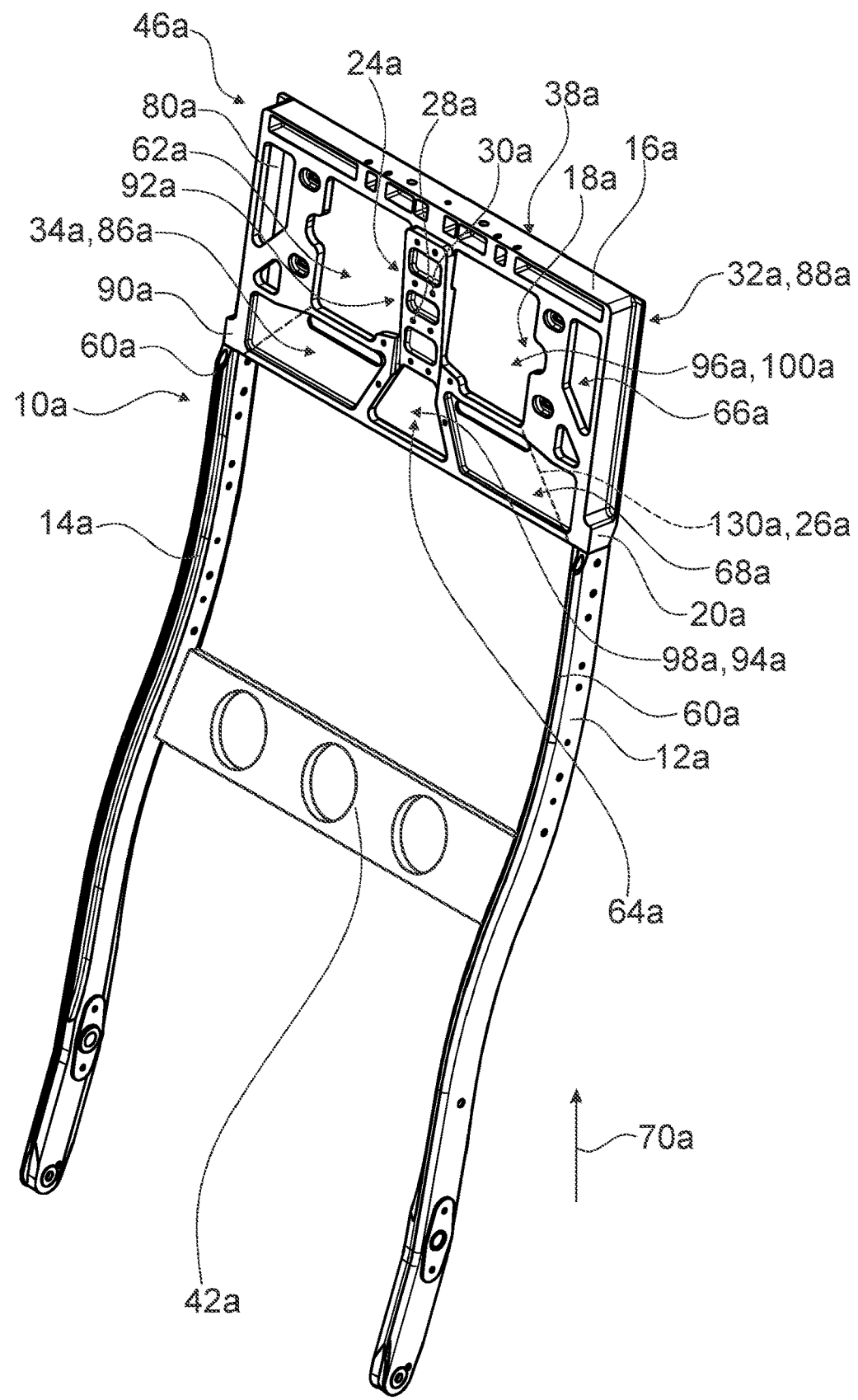
FIG. 2 shows a schematic perspective view of the aircraft seat device.
Figure 3:
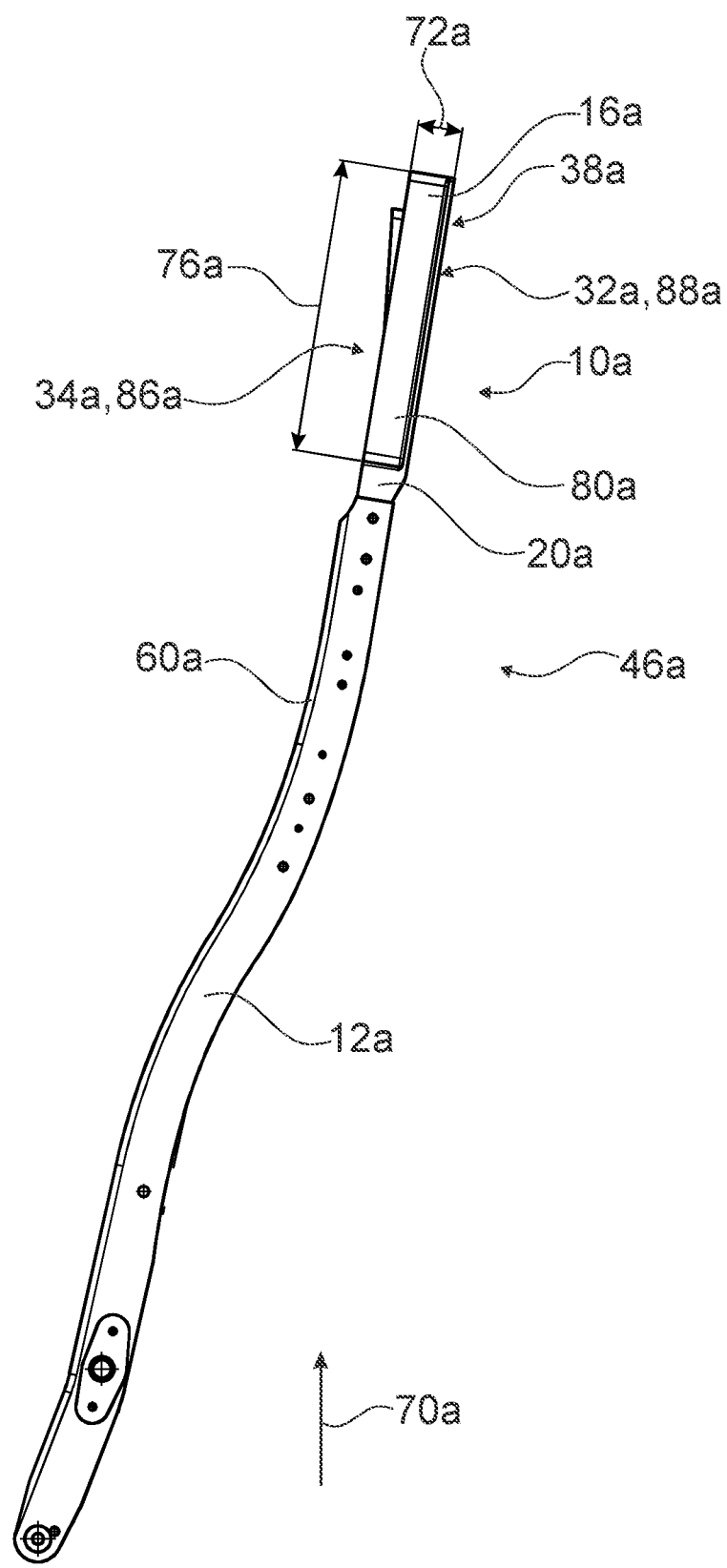
FIG. 3 shows a schematic side view of the aircraft seat device.
Figure 4:
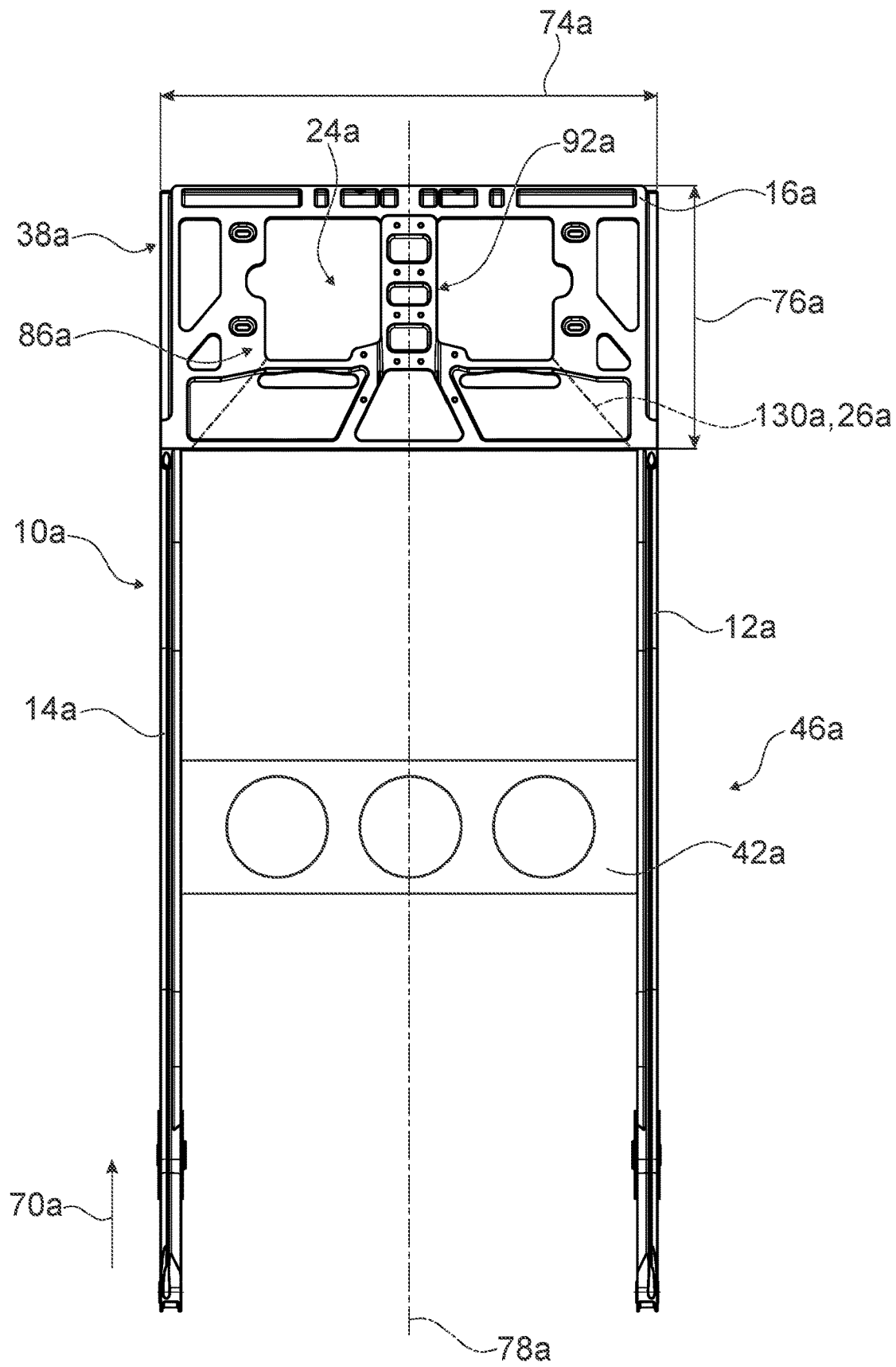
FIG. 4 shows a schematic view of a rear side of the aircraft seat device.

FIG. 1 shows an aircraft seat 44a. The aircraft seat 44a is part of a row of seats 54a within an aircraft passenger cabin. The aircraft seat 44a has an aircraft seat backrest 56a. The aircraft seat 44a has an aircraft seat bottom 58a. The aircraft seat 44a comprises an aircraft seat device 46a. The aircraft seat 44a is illustrated in FIG. 1 in a ready to use state relative to an mounting direction 70a of the aircraft seat 44a.

FIGS. 2 to 5 show different views of the aircraft seat device 46a. The aircraft seat device 46a has a backrest frame unit 10a. The backrest frame unit 10a is formed from many parts. The backrest frame unit 10a comprises a first side frame element 12a. The backrest frame unit 10a comprises a second side frame element 14a. The side frame elements 12a, 14a are at least substantially identical to each other. The side frame elements 12a, 14a are formed in mirror-image fashion relative to each other. Alternatively, the side frame elements 12a, 14a, apart from production tolerances, could be identical to each other or different from each other. The second side frame element 14a is separate from the first side frame element 12a. The second side frame element 14a is separate from the first side frame element 12a. The first side frame element 12a and the second side frame element 14a are arranged on opposite sides of the backrest frame unit 10a. The side frame elements 12a, 14a are formed as in particular bent and/or curved, aluminum or magnesium extruded profiles. Alternatively, the side frame elements 12a, 14a could also be formed from a plastic or another metal.

Figure 5:
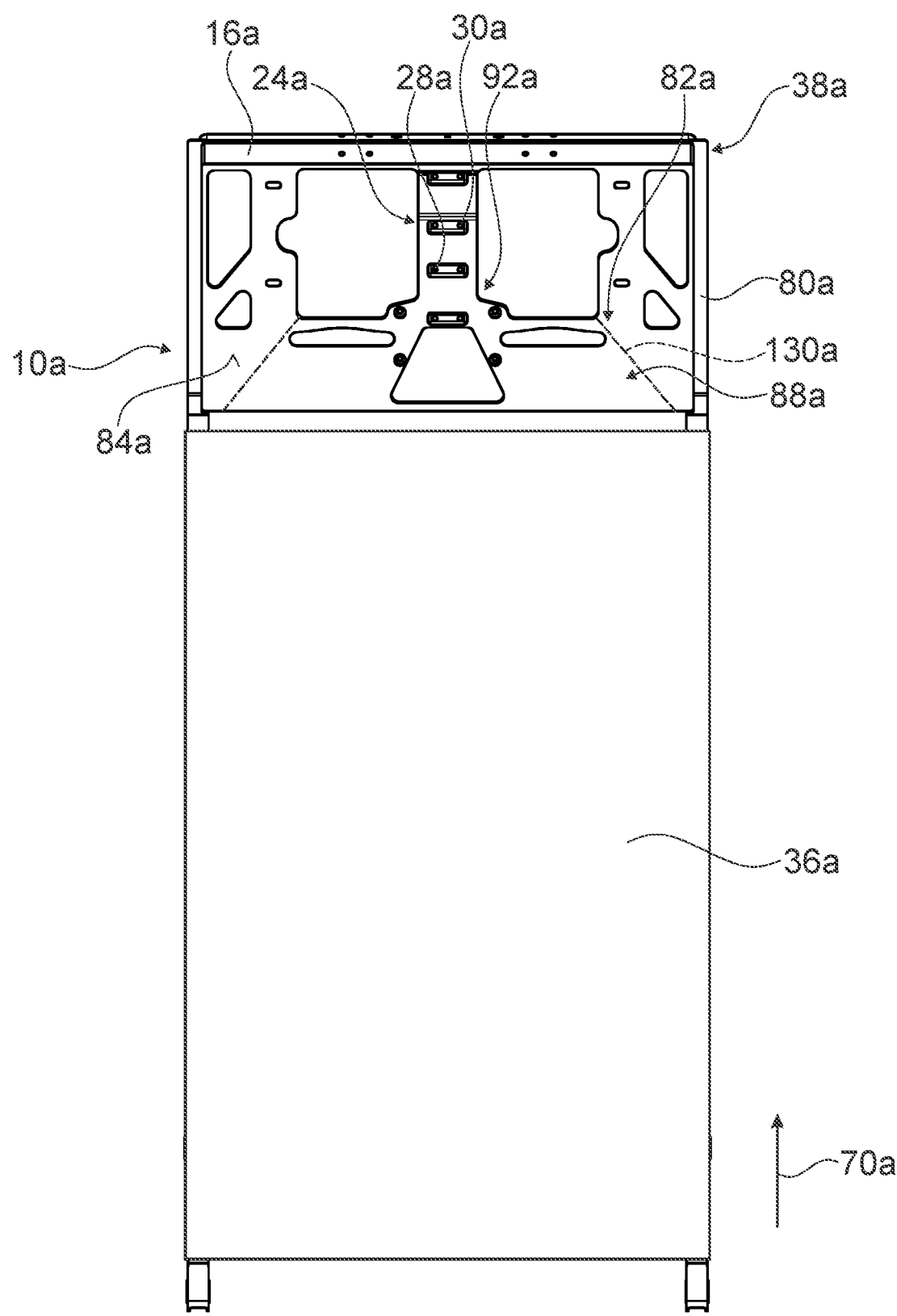
FIG. 5 shows a schematic view of a front side of the aircraft seat device.

The backrest frame unit 10a has a cover 36a (cf. FIG. 5). The cover 36a is formed as a textile or else as a fiber mat. The side frame elements 12a, 14a are configured for mounting the cover 36a of the backrest frame unit 10a. The side frame elements 12a, 14a each have a piping guide element 60a. The piping guide element 60a is configured to hold the cover 36a under tension.

The backrest frame unit 10a has a transverse frame element 16a. The transverse frame element 16a is separate from the side frame elements 12a, 14a. The transverse frame element 16a is configured to connect the side frame elements 12a, 14a. The transverse frame element 16a is formed in one piece. The transverse frame element 16a is monolithic. The transverse frame element 16a illustrated by way of example is to a large extent produced by means of primary forming. The transverse frame element 16a illustrated by way of example is produced as an injection molded part. The transverse frame element 16a illustrated by way of example is produced as a casting made of fiber reinforced plastic. The transverse frame element 16a forms an upper termination 38a of the backrest frame unit 10a. The backrest frame unit 10a has a further transverse frame element 42a. The further transverse frame element 42a is connected to the side frame elements 12a, 14a in a central area of the side frame elements 12a, 14a. The further transverse frame element 42a is used to further increase the stiffness and the stability of the aircraft seat device 46a.

The transverse frame element 16a is realized at least substantially plate-shaped. The transverse frame element 16a has a maximum height 76a (cf. FIG. 4). The maximum height 76a is an extent of the transverse frame element 16a parallel to the mounting direction 70a. The maximum height 76a of the transverse frame element 16a illustrated by way of example is 22 cm. The transverse frame element 16a has a maximum width 74a (cf. FIG. 4). The maximum width 74a is an extent of the transverse frame element 16a perpendicular to the mounting direction 70a and parallel to a main extension plane of the transverse frame element 16a. The maximum width 74a of the transverse frame element 16a illustrated by way of example is 38 cm. The transverse frame element 16a has a maximum depth 72a (cf. FIG. 3). The maximum depth 72a is an extent of the transverse frame element 16a perpendicular to the mounting direction 70a and perpendicular to the main extension plane of the transverse frame element 16a. The maximum depth 72a of the transverse frame element 16a illustrated by way of example is 27 mm. The maximum height 76a of the transverse frame element 16a is more than 8 times greater than the maximum depth 72a of the transverse frame element 16a. The maximum width 74a of the transverse frame element 16a is more than 14 times greater than the maximum depth 72a of the transverse frame element 16a. The transverse frame element 16a is at least substantially cubic. The transverse frame element 16a has, at least substantially, the shape of a rectangle.

The transverse frame element 16a has a skeleton-like structure 18a. The transverse frame element 16a has a plurality of passages 62a, 64a, 66a. The transverse frame element 16a has a plurality of recesses 68a. The skeleton-like structure 18a is formed at least by the plurality of recesses 68a and passages 62a, 64a, 66a. The transverse frame element 16a is formed mirror-symmetrically relative to a mirror plane 78a. The mirror plane 78a runs perpendicular to the main extension plane, centrally through the transverse frame element 16a. The transverse frame element 16a has an edging 80a. The edging 80a runs partially around the transverse frame element 16a. The edging 80a imparts to the transverse frame element 16a approximately a shape of a flat box. The edging 80a projects perpendicularly from a plate plane of the transverse frame element 16a. The edging 80a projects perpendicularly from the main extension plane of the transverse frame element 16a. The side frame elements 12a, 14a are continued circumferentially around the transverse frame element 16a by the edging 80a. The edging 80a forms the maximum depth 72a of the transverse frame element 16a. The edging 80a projects by at least 10 mm, preferably at least 15 mm and preferably at least 20 mm above an in particular central surface 84a of the transverse frame element 16a in an inner area 82a (cf. FIG. 5) of the transverse frame element 16a. The edging 80a projects in the direction of a front side 86a of the transverse frame element 16a. Alternatively, the edging 80a could also project in the direction of a rear side 88a of the transverse frame element 16a.

The transverse frame element 16a has a first connection element 20a. The first connection element 20a is configured for fastening at least one of the side frame elements 12a, 14a. The first connection element 20a is formed integrally with the transverse frame element 16a. The first connection element 20a is formed in one piece with the transverse frame element 16a. The transverse frame element 16a has a second connection element 90a. The second connection element 90a is configured for fastening at least a further one of the side frame elements 12a, 14a. The second connection element 90a is at least substantially identical to the first connection element 20a. The second connection element 90a is formed integrally with the transverse frame element 16a. The second connection element 90a is formed in one piece with the transverse frame element 16a. The connection elements 20a, 90a are each formed as a cavity 22a in the transverse frame element 16a that is matched to an external shape of the side frame element 12a, 14a (cf. also FIG. 6). During the mounting of the side frame elements 12a, 14a on the transverse frame element 16a, the side frame elements 12a, 14a are inserted into the cavities 22a of the connection elements 20a, 90a and fixed therein. It is conceivable that the transverse frame element 16a has further connection elements, which can be used optionally for mounting the side frame elements 12a, 14a, depending on the desired implementation of the backrest frame unit 10a, in particular depending on the desired width of the aircraft seat device 46a.

The transverse frame element 16a has a fastening unit 24a. The fastening unit 24a is configured for mounting at least one functional unit 26a. The functional unit 26a can be realized as a headrest 134a (cf. FIG. 10), as a headrest mount 102a (cf. FIG. 6), as an aircraft meal table locking 132a (cf. FIG. 10), as a tall literature pocket 128a (cf. FIG. 10), as a monitor, as a monitor mount, as an upholstery attachment, as a cup holder, as a tablet holder, as a USB connector or as a further electronic component. The fastening unit 24a comprises a fastening matrix. The fastening unit 24a comprises a hole matrix 92a. The fastening unit 24a comprises fastening elements 28a, 30a, 98a, 100a. The fastening elements 28a, 30a, 98a, 100a are at least partly formed as holes of the hole matrix 92a. The fastening unit 24a comprises pre-formed receiving regions 94a, 96a for the at least substantially form-fitting holding of functional units 26a. The fastening elements 28a, 30a, 98a, 100a are at least partly formed as receiving regions 94a, 96a. The shape and arrangement of the fastening elements 28a, 30a, 98a, 100a are specifically matched to the respective functional units 26a to be mounted. The fastening unit 24a has the plurality of fastening elements 28a, 30a, 98a, 100a. Each of the different fastening elements 28a, 30a, 98a, 100a is respectively configured for fastening a different implementation of one of the functional units 26a or different functional units 26a.

The transverse frame element 16a has a functional unit 26a, which is formed as an energy absorption element 130a. The energy absorption element 130a is used to absorb impact energy in the event of an impact of a part of a body in the transverse frame element 16a. The energy absorption element 130a is formed as an intended fracture point. During the impact of the part of the body, the transverse frame element 16a breaks along the intended fracture point and thus releases additional travel for a movement of the part of the transverse frame element 16a that has broken out. As a result, personal safety, in particular in the event of a catastrophe, can advantageously be improved. Alternatively or additionally, the energy absorption element 130a can also be formed as at least one component made of an absorber material, such as, for example, a particulate foam, in particular EPP (expanded polypropylene), which is fastened to the transverse frame element 16a.

Figure 6:
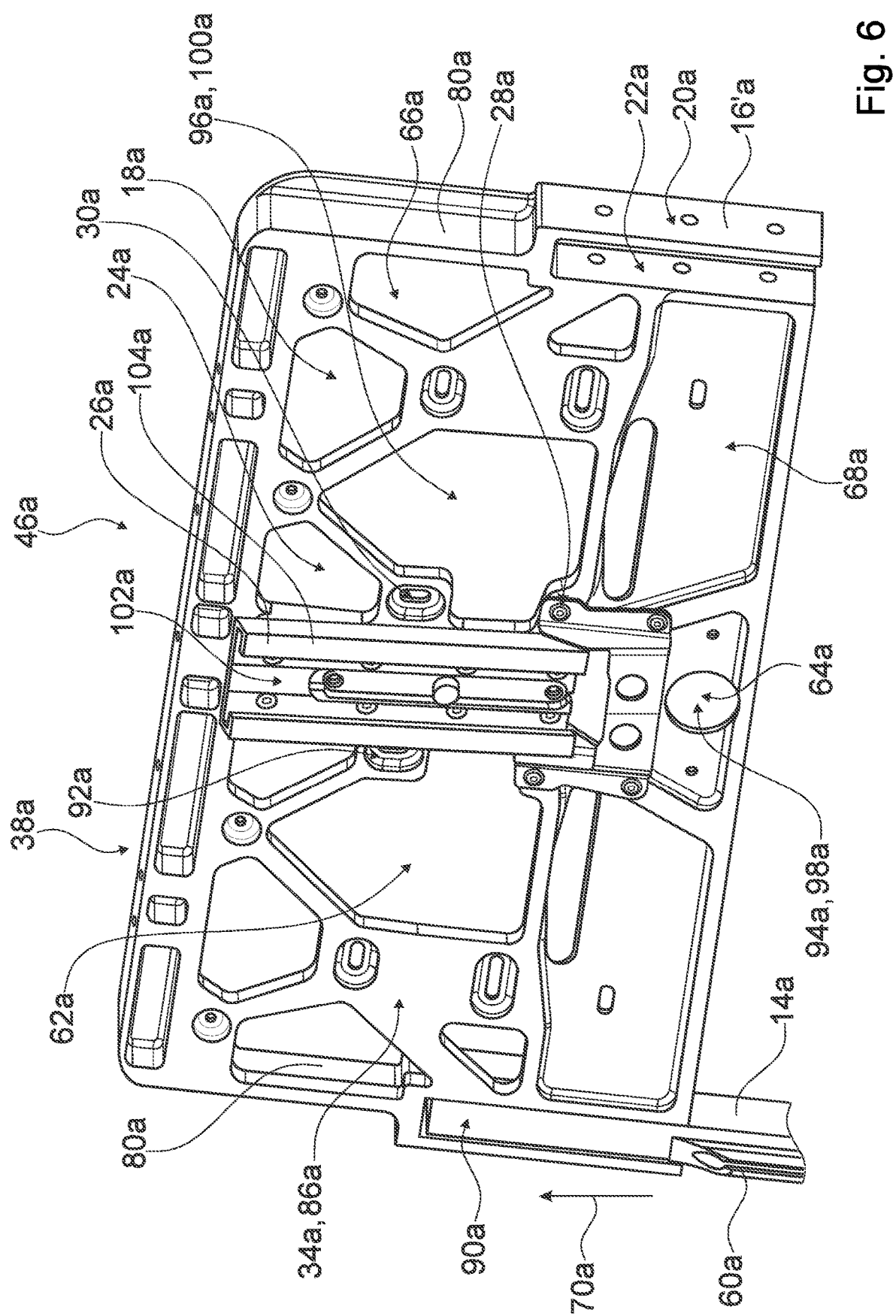
FIG. 6 shows a schematic perspective partial view of the aircraft seat device with an alternative transverse frame element.

FIG. 6 shows a partial view of the aircraft seat device 46a with an alternative transverse frame element 16'a. The alternative transverse frame element 16'a differs from the transverse frame element 16a of FIGS. 2 to 5 mainly in a different arrangement of the fastening elements 28a, 30a, 98a, 100a and in a different implementation of the cavity 22a of the connection elements 20a, 90a. In addition, the headrest mount 102a is fastened to the fastening unit 24a of the alternative transverse frame element 16'a. The headrest mount 102a has a rail 104a. The headrest mount 102a is configured for mounting a headrest 134a. The headrest 134a mounted on the headrest mount 102a is movable along the rail 104a. A vertical adjustment of the headrest 134a mounted on the headrest mount 102a can be performed by means of the movement along the rail 104a.

The fastening unit 24a of the alternative transverse frame element 16'a has a first fastening element 98a on a first side 32a of the transverse frame element 16'a. The first side 32a of the transverse frame element 16'a forms the rear side 88a of the transverse frame element 16'a. The fastening unit 24a of the alternative transverse frame element 16'a has a second fastening element 28a on a second side 34a of the transverse frame element 16'a. The second side 34a forms the front side 86a of the transverse frame element 16'a. The second side 34a is arranged opposite from the first side 32a. The first fastening element 98a is formed as a receiving region 94a. The first fastening element 98a is formed as a hole to hold one of the functional units 26a. The first fastening element 98a is configured for mounting an aircraft meal table locking 132a. The second fastening element 28a is formed as a hole of the hole matrix 92a. The second fastening element 28a is formed for firmly screwing or riveting one of the functional units 26a. The second fastening element 28a is configured for mounting the headrest mount 102a. The headrest mount 102a and the aircraft meal table locking 132a are fastened to the transverse frame element 16'a on different sides 32a, 34a of the transverse frame element 16'a in an operation-ready state of the aircraft seat device 46a. The fastening unit 24a offers the possibility of fastening a multiplicity of further or alternative functional units 26a to both sides 32a, 34a of the transverse frame element 16'a.

Figure 7:
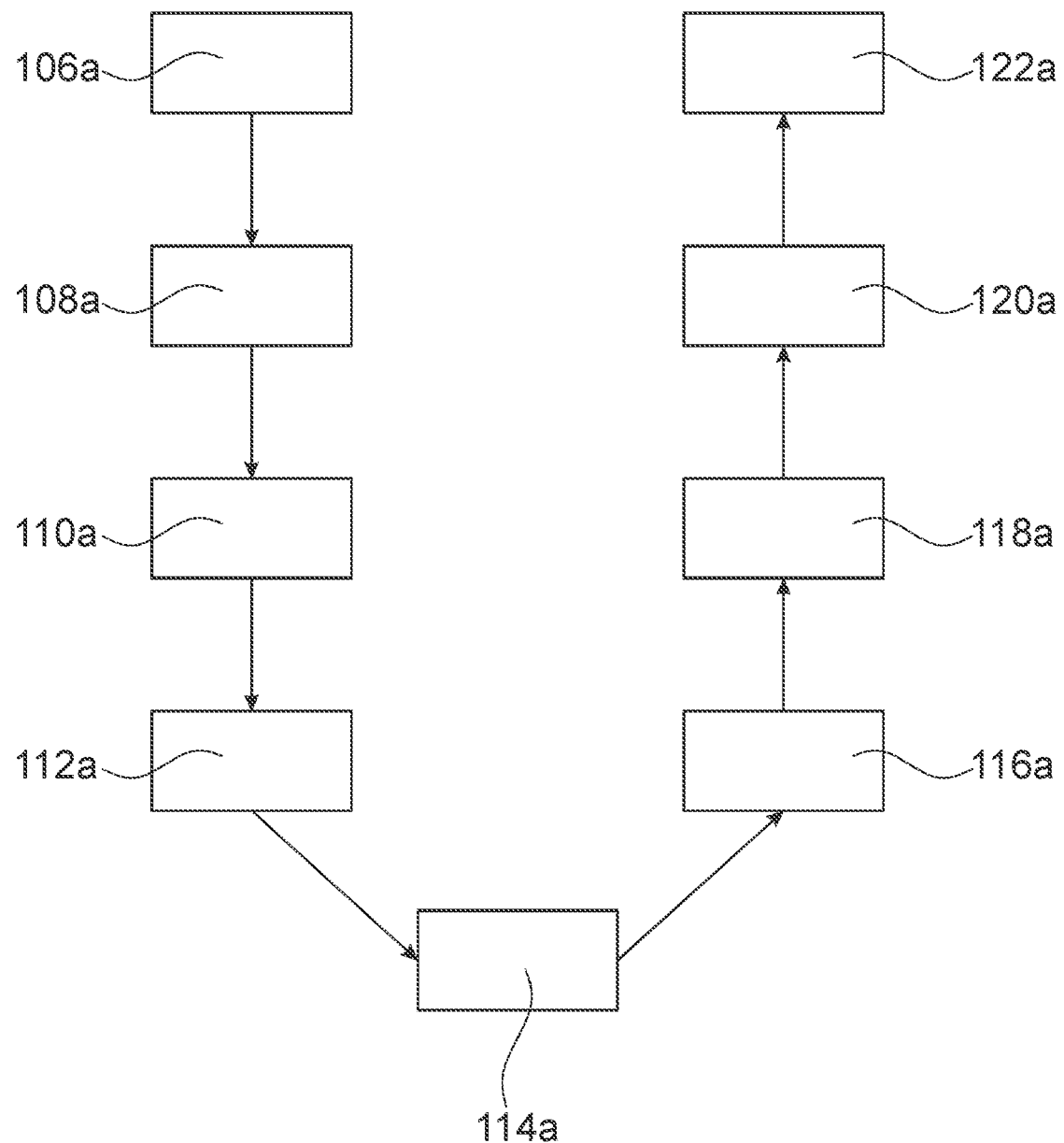
FIG. 7 shows a schematic flowchart of a method.

FIG. 7 shows a flowchart of a method for producing the aircraft seat device 46a. The method steps 106a, 108a, 110a, 112a, 114a, 116a, 118a, 120a, 122a can be carried out in different orders. In particular, it is possible to depart substantially from the order described below. In at least one method step 106a, the transverse frame element 16a is produced by means of a primary forming method, for example injection molding, diecasting and/or 3D printing. In particular, it is conceivable that smaller reprocessing by means of primary forming processes are then carried out. The transverse frame element 16a is produced in one piece in the method step 106a. In at least one further method step 108a, the side frame elements 12a, 14a are produced by means of extrusion and possible subsequent bending. In at least one further method step 110a, the side frame elements 12a, 14a are introduced into the cavities 22a of the connection elements 20a, 90a and are fastened to the transverse frame element 16a. In at least one further method step 112a, the further transverse frame element 42a is fastened in the central area of the side frame elements 12a, 14a. In at least one further method step 114a, the cover 36a is fixed to the side frame elements 12a, 14a. In at least one further method step 116a, a functional unit 26a is fastened to the front side 86a of the transverse frame element 16a. In at least one further method step 118a, a further functional unit 26a is fastened to the rear side 88a of the transverse frame element 16a. In at least one method step 120a, a cover (not shown) is slipped over the transverse frame element 16a. In at least one further method step 122a, the aircraft seat device 46a is integrated into the aircraft seat 44a.

Figure 8:
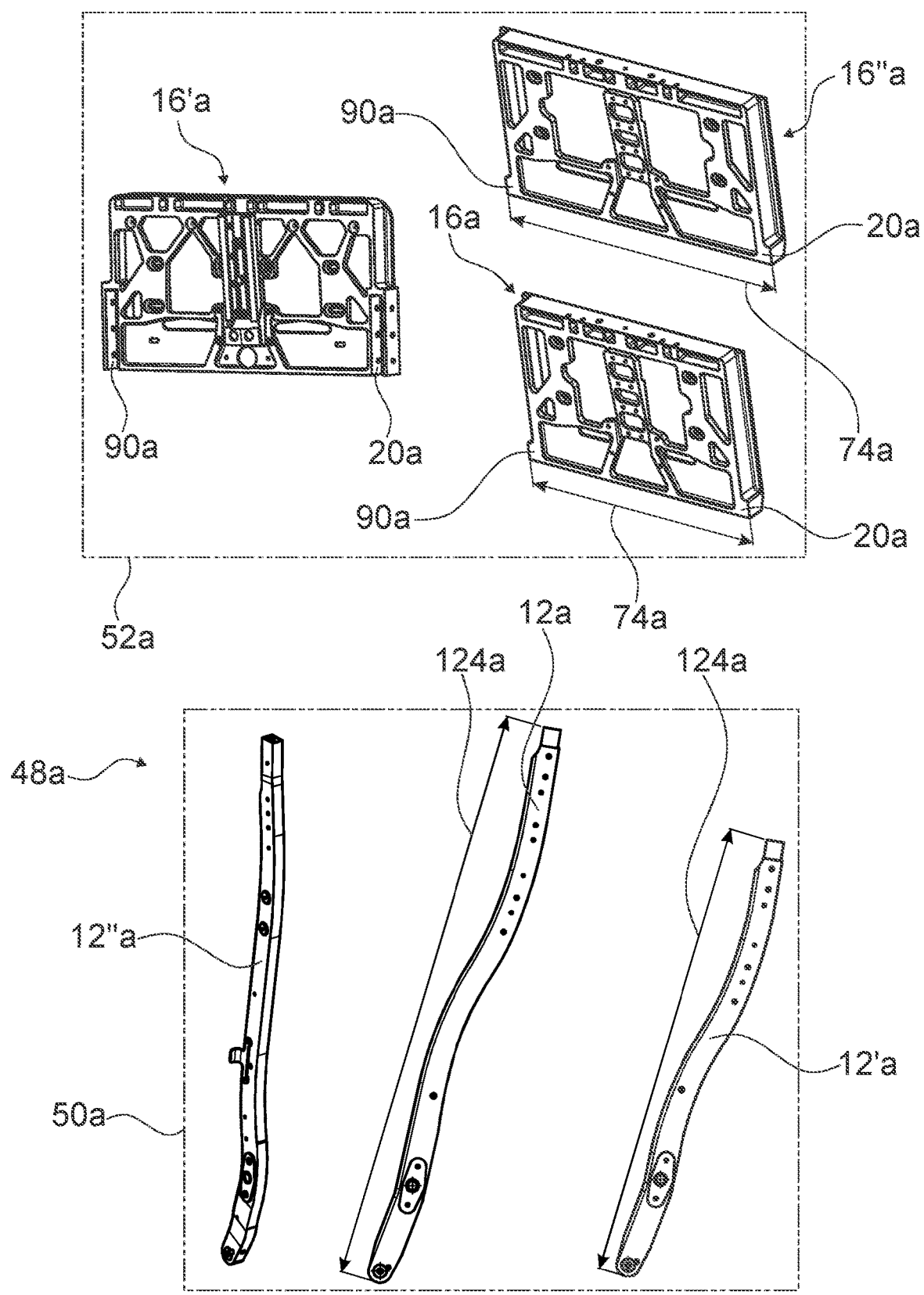
FIG. 8 shows a schematic illustration of a modular system.

FIG. 8 shows a modular system 48a for assembling the aircraft seat device 46a. The modular system 48a has a set 50a of differently realized pairs of side frame elements 12a, 12'a, 12"a. The various side frame elements 12a, 12'a, 12"a of the set 50a of side frame elements 12a, 12'a, 12"a are configured for the assembly of different aircraft seat devices 46a. At least some of the side frame elements 12a, 12'a, 12"a of the set 50a of side frame elements 12a, 12'a, 12"a have different lengths 124a. At least some of the side frame elements 12a, 12'a, 12"a of the set 50a of side frame elements 12a, 12'a, 12"a have different materials and/or material thicknesses. At least some of the side frame elements 12a, 12'a, 12"a of the set 50a of side frame elements 12a, 12'a, 12"a have different outer shapes, for example different curvatures.

The modular system 48a has a set 52a of differently realized transverse frame elements 16a, 16'a, 16"a. The various transverse frame elements 16a, 16'a, 16"a of the set 52a of transverse frame elements 16a, 16'a, 16"a are configured for the assembly of different aircraft seat devices 46a, in particular aircraft seat devices 46a of different widths, preferably aircraft seats 44a of different widths. At least some of the various transverse frame elements 16a, 16'a, 16"a of the set 52a of transverse frame elements 16a, 16'a, 16"a are configured to hold different functional units 26a. At least some of the transverse frame elements 16a, 16'a, 16"a of the set 52a of transverse frame elements 16a, 16'a, 16"a have different widths 74a. At least some of the transverse frame elements 16a, 16'a, 16"a of the set 52a of transverse frame elements 16a, 16'a, 16"a can have different heights 76a. At least some of the transverse frame elements 16a, 16'a, 16"a of the set 52a of transverse frame elements 16a, 16'a, 16"a can have different depths 72a. At least some of the transverse frame elements 16a, 16'a, 16"a of the set 52a of transverse frame elements 16a, 16'a, 16"a have different shapes and/or different structuring, for example different fastening units 24a. The transverse frame elements 16a, 16'a, 16"a of the set 52a of differently realized transverse frame elements 16a, 16'a, 16"a each have connection elements 20a, 90a. The connection elements 20a, 90a of the transverse frame elements 16a, 16'a, 16"a of the set 52a of differently realized transverse frame elements 16a, 16'a, 16"a each permit mounting of all the pairs of side frame elements 12a, 12'a, 12"a of the set 50a of side frame elements 12a, 12'a, 12"a. The side frame elements 12a, 12'a, 12"a of the set 50a of side frame elements 12a, 12'a, 12"a can be combined as desired with the transverse frame elements 16a, 16'a, 16"a of the set 52a of transverse frame elements 16a, 16'a, 16"a. As a result of the combinations of the side frame elements 12a, 12'a, 12"a of the set 50a of side frame elements 12a, 12'a, 12"a and the transverse frame elements 16a, 16'a, 16"a of the set 52a of transverse frame elements 16a, 16'a, 16"a, a multiplicity of differently formed backrest frame units 10a can be constructed. The set 52a of transverse frame elements 16a, 16'a, 16"a and/or the set 50a of side frame elements 12a, 12'a, 12"a can in particular each have more or fewer different transverse frame elements 16a, 16'a, 16"a and/or more or fewer different side frame elements 12a, 12'a, 12"a than illustrated in FIG. 8.

Figure 9:
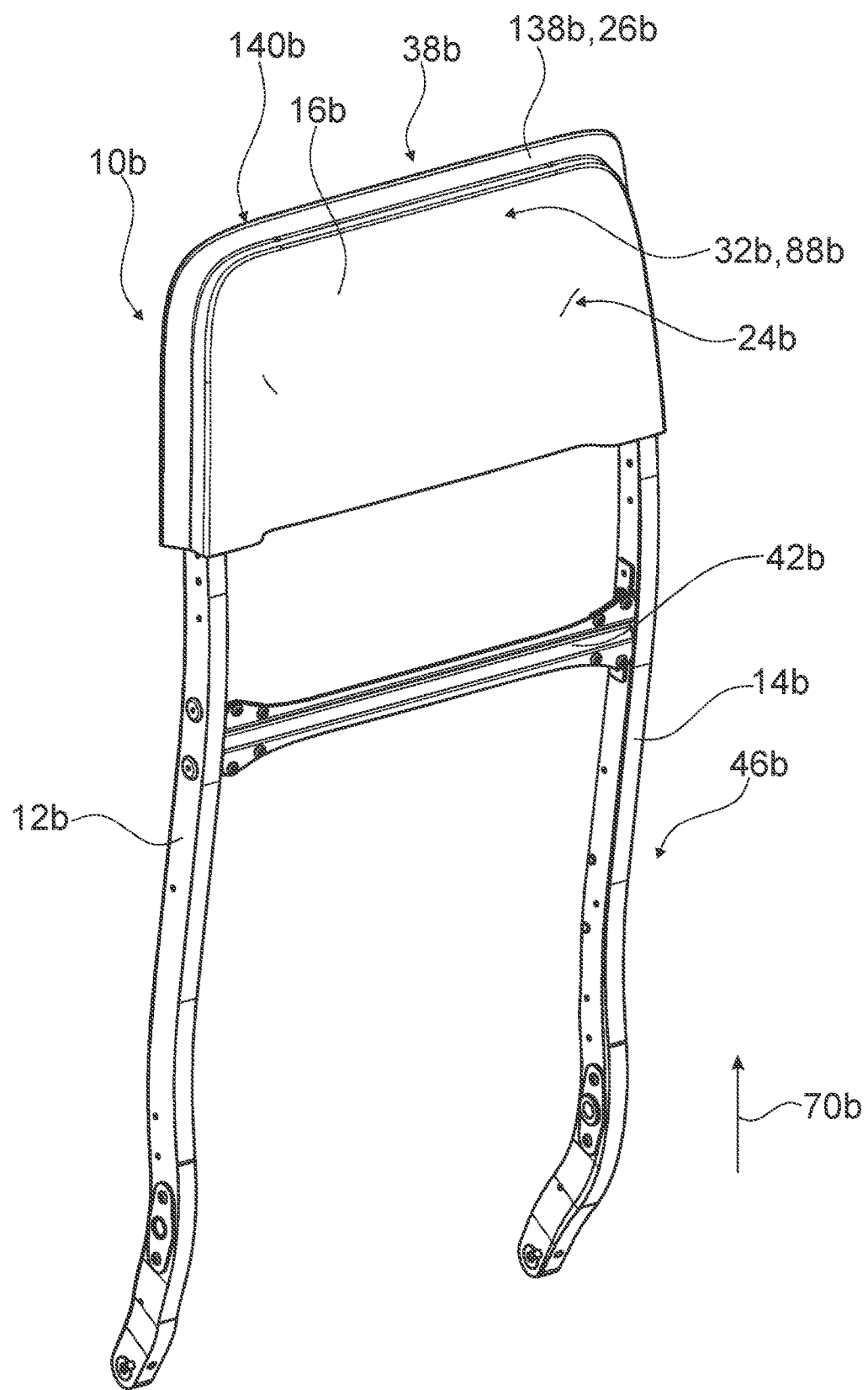
FIG. 9 shows a schematic perspective view of an alternative aircraft seat device.
Figure 10:
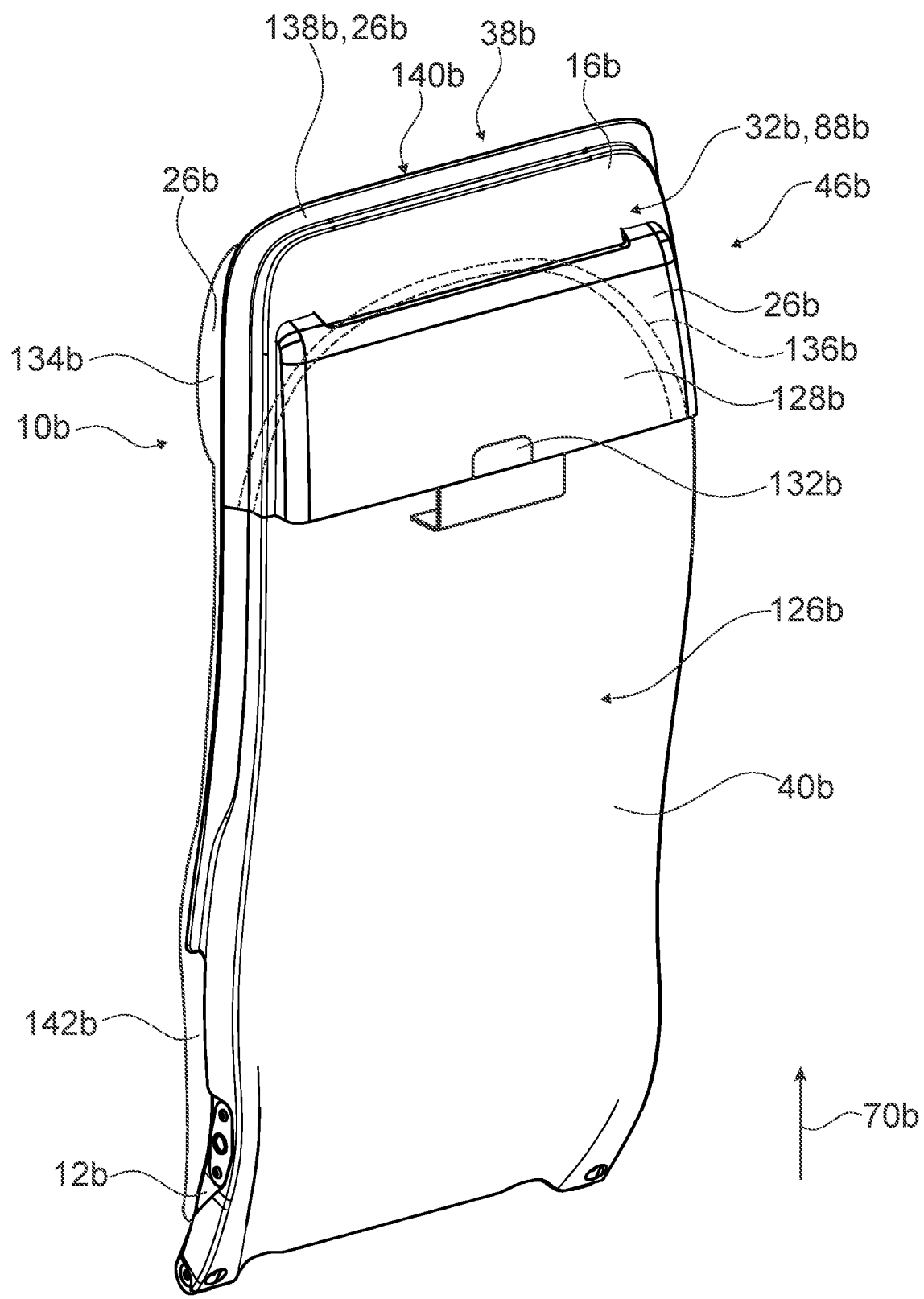
FIG. 10 shows a further schematic perspective view of the alternative aircraft seat device.

A further exemplary embodiment of the invention is shown in FIGS. 9 and 10. The following descriptions and the drawings are restricted substantially to the differences between the exemplary embodiments, wherein, with respect to identically designated components, in particular in relation to components with the same designations, in principle reference can also be made to the drawings and/or the description of the other exemplary embodiments, in particular FIGS. 1 to 8. In order to distinguish the exemplary embodiments, the letter a is appended to the designations of the exemplary embodiment in FIGS. 1 to 8. In the exemplary embodiment of FIGS. 9 and 10, the letter a is replaced by the letter b.

FIG. 9 shows an alternative aircraft seat device 46b. The aircraft seat device 46b has an alternative backrest frame unit 10b. The backrest frame unit 10b comprises a first side frame element 12b, a second side frame element 14b and a transverse frame element 16b. The first side frame element 12b is shaped differently from the second side frame element 14b, in particular curved differently. The transverse frame element 16b connects the two side frame elements 12b, 14b. The transverse frame element 16b is formed as a visible part of an aircraft seat backrest 56b. The transverse frame element 16b has a fastening unit 24b. The fastening unit 24b is configured for mounting at least one functional unit 26b. The transverse frame element 16b illustrated by way of example in FIG. 9 is produced as a diecast part. The transverse frame element 16a is produced as a magnesium and/or aluminum diecast part.

FIG. 10 shows the alternative aircraft seat device 46b with four functional units 26b and with a backrest covering 40b. The aircraft seat device 46b has the backrest covering 40b. The backrest covering 40b is configured to cover an interspace between the side frame elements 12b, 14b. The backrest covering 40b is arranged on a rear side 126b of the aircraft seat device 46b. The backrest covering 40b is fastened to the side frame elements 12b, 14b. The backrest covering 40b ends flush with the transverse frame element 16b. The backrest covering 40b is formed from a deep-drawn film. The first functional unit 26b illustrated by way of example in FIG. 10 is formed as a tall literature pocket 128b. The tall literature pocket 128b is fastened to a rear side 88b of the transverse frame element 16b by means of the fastening unit 24b. The second functional unit 26b illustrated by way of example in FIG. 10 is realized as a headrest 134b. The headrest 134b is fastened to a front side 86b of the transverse frame element 16b by means of the fastening unit 24b. In the case illustrated by way of example, the headrest 134b is formed as a foam part, which is connected to a further backrest foam part 142b, in particular formed in one piece. In such a case, direct fastening of the headrest 134b to the transverse frame element 16b is optional. In particular, such a headrest 134b can also only be leant on the transverse frame element 16b. The third functional unit 26b illustrated by way of example in FIG. 10 is formed as an aircraft meal table locking 132b. The aircraft meal table locking 132b is fastened to a rear side 88b of the transverse frame element 16b by means of the fastening unit 24b. The fourth functional unit 26b illustrated by way of example in FIG. 10 is formed as an upholstery attachment 138b, in particular as part of an upholstery attachment 138b, for example as a fastening of a hook tape or a fleece tape. In the case illustrated, the upholstery attachment 138b is formed in one piece with the transverse frame element 16b. The upholstery attachment 138b is arranged in a marginal area 140b of the transverse frame element 16b. The upholstery attachment 138b runs partly around the transverse frame element 16b on an outer side of the transverse frame element 16b. Alternatively, the upholstery attachment 138b can be fastened to the transverse frame element 16b by means of the fastening unit 24b. The transverse frame element 16b illustrated by way of example in FIG. 10 has a stiffening element 136b. The stiffening element 136b is formed as a depression running in the form of a curve in the transverse frame element 16b. The stiffening element 136b connects the two side frame elements 12b, 14b. The stiffening element 136b replicates a course of a circumferential frame.

Figure 11:
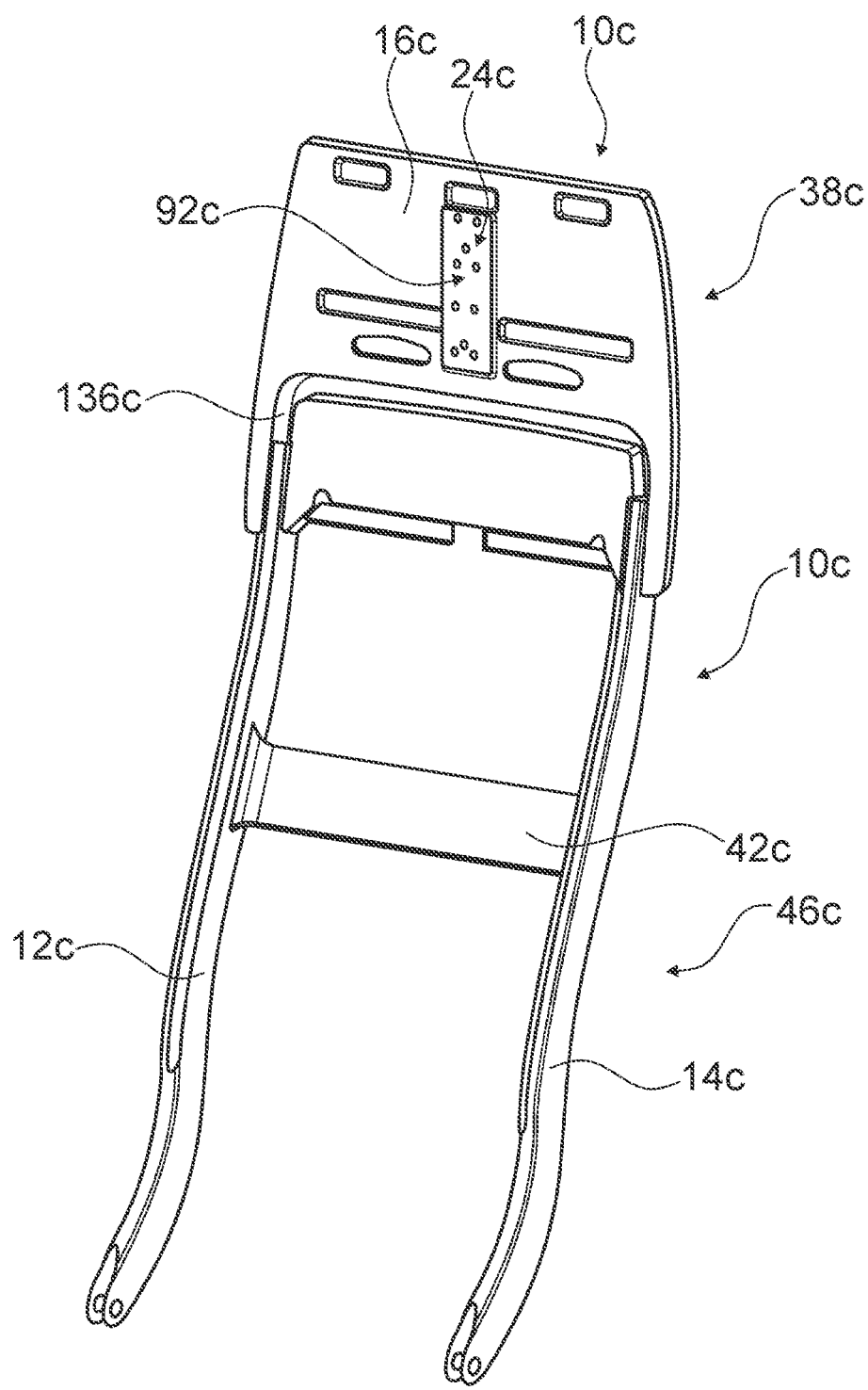
FIG. 11 shows a schematic perspective view of a further alternative aircraft seat device.

FIG. 11 shows a further alternative aircraft seat device 46c. The aircraft seat device 46c has a further alternative backrest frame unit 10c. The backrest frame unit 10c comprises a first side frame element 12c, a second side frame element 14c and a transverse frame element 16c. The transverse frame element 16c connects the two side frame elements 12c, 14c. The transverse frame element 16c is formed as a bent sheet metal part. The transverse frame element 16c has a fastening unit 24c. The fastening unit 24c is configured for mounting at least one functional unit 26c. The transverse frame element 16c has a stiffening element 136c. The stiffening element 136c is formed as a depression running in a curve in the transverse frame element 16c. The stiffening element 136c connects the two side frame elements 12c, 14c. The stiffening element 136c replicates a course of a circumferential frame. The stiffening element 136c is configured to prevent torsion of the transverse frame element 16c. The stiffening element 136c is arranged, at least to a large extent, preferably completely, in a lower sub-region of the transverse frame element 16c, preferably a lower half of the transverse frame element 16c. Preferably, the stiffening element 136c is arranged at least underneath fastening elements 28c, 30c of the fastening unit 24c, such as, for example, a hole matrix 92c for fastening a headrest 134c.

The invention claimed is:

1. An aircraft seat device having
 a multi-part backrest frame unit comprising
  at least one first side frame element,
  at least one second side frame element, which is arranged on a side of the backrest frame unit that is opposite from the first side frame element, and
  at least one transverse frame element which is realized separately from the side frame elements and connects the side frame elements,
 wherein the transverse frame element is realized at least substantially plate-shaped,
 wherein the transverse frame element forms an upper termination of the backrest frame unit,
 wherein the transverse frame element has at least one fastening unit, which is configured for mounting several functional units,
 wherein the fastening unit has at least two fastening elements,
 wherein each of the fastening elements is configured for fastening different implementations of one of the functional units or for fastening different functional units, and
 wherein the transverse frame element comprises an edging running at least partly around the transverse frame element and projecting at least substantially perpendicularly from a plate plane of the transverse frame element.

2. The aircraft seat device as claimed in claim 1,
 wherein the transverse frame element is formed in one piece.

3. The aircraft seat device as claimed in claim 1,
 wherein the transverse frame element has a skeleton-like structure.

4. The aircraft seat device as claimed in claim 1,
 wherein the transverse frame element has at least one integrally formed connection element for fastening at least one of the side frame elements.

5. The aircraft seat device as claimed in claim 4,
 wherein the connection element is formed as a cavity in the transverse frame element that is matched to an outer shape of the side frame element.

6. The aircraft seat device as claimed in claim 1,
 wherein the functional unit is realized as a headrest, as a headrest mount, as an aircraft meal table locking, as a tall literature pocket, as a monitor, as a monitor mount, as an upholstery attachment, as a cup holder, as a tablet holder, as a USB connector or as a further electronic component.

7. The aircraft seat device as claimed in claim 1,
 wherein the fastening unit on a first side of the transverse frame element has at least one first fastening element, and the fastening unit on a second side of the transverse frame element that is opposite from the first side has at least one second fastening element,
 wherein the first fastening element is configured for mounting an aircraft meal table locking or for the monitor attachment, and
 wherein the second fastening element is configured for mounting a headrest and/or a headrest mount.

8. The aircraft seat device as claimed in claim 1,
 wherein at least the first side frame element is configured for mounting a cover of the backrest frame unit.

9. The aircraft seat device as claimed in claim 1,
 wherein the transverse frame element forms a visible part of an aircraft seat backrest.

10. The aircraft seat device as claimed in claim 1,
wherein the backrest frame unit has at least one further transverse frame element, which is connected to the side frame elements in a central area of the side frame elements.

11. An aircraft seat device as claimed in claim 1,
wherein the transverse frame element is, at least to a large extent, produced by means of primary forming.

12. The aircraft seat device as claimed in claim 1,
wherein the transverse frame element is produced as a cast part, in particular an injection molded part and/or a diecast part.

13. An aircraft seat having
an aircraft seat device as claimed in claim 1.

14. A modular system for assembling an aircraft seat device as claimed in claim 1, having
at least one set of differently realized pairs of side frame elements and having
at least one set of differently realized transverse frame elements, which in each case have connection elements permitting assembly of all the pairs of side frame elements of the set of side frame elements.

15. The modular system as claimed in claim 14,
wherein the different transverse frame elements of the set of differently realized transverse frame elements are configured for the assembly of aircraft seat devices of different widths, in particular aircraft seats of different widths.

* * * * *